(12) United States Patent
Kanekiyo et al.

(10) Patent No.: US 11,901,807 B2
(45) Date of Patent: Feb. 13, 2024

(54) BYPASS CIRCUIT, POWER SYSTEM CONTROL METHOD, AND NON-TRANSITORY COMPUTER READABLE MEDIUM

(71) Applicant: KABUSHIKI KAISHA TOSHIBA, Tokyo (JP)

(72) Inventors: Yasuhiro Kanekiyo, Yokohama Kanagawa (JP); Qiang Lin, Kawasaki Kanagawa (JP); Hiroshi Uno, Kawasaki Kanagawa (JP); Tetsu Shijo, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/682,935

(22) Filed: Feb. 28, 2022

(65) Prior Publication Data

US 2023/0081126 A1    Mar. 16, 2023

(30) Foreign Application Priority Data

Sep. 15, 2021    (JP) .................. 2021-150582

(51) Int. Cl.
*H02M 1/32* (2007.01)
*H02S 40/38* (2014.01)
*H02M 3/158* (2006.01)
*H02J 7/35* (2006.01)

(52) U.S. Cl.
CPC .......... *H02M 1/32* (2013.01); *H02J 7/35* (2013.01); *H02M 3/158* (2013.01); *H02S 40/38* (2014.12)

(58) Field of Classification Search
CPC .... H02J 7/00; H02J 7/35; H02M 1/00; H02M 1/32; H02M 3/00; H02M 3/158; H02S 40/00; H02S 40/38
USPC ........................................... 307/11
See application file for complete search history.

(56) References Cited

U.S. PATENT DOCUMENTS

| 2013/0062953 | A1* | 3/2013 | Nurmi | ...... | H02S 40/38 307/72 |
| 2015/0295513 | A1* | 10/2015 | Bixel | ...... | H02M 7/5387 307/72 |
| 2016/0322860 | A1* | 11/2016 | Wu | ...... | H02J 9/06 |
| 2021/0344201 | A1* | 11/2021 | Li | ...... | H02J 3/381 |

FOREIGN PATENT DOCUMENTS

JP    2013-46503 A    3/2013

* cited by examiner

*Primary Examiner* — Jeffrey M Shin
(74) *Attorney, Agent, or Firm* — Finnegan, Henderson, Farabow, Garrett & Dunner, LLP

(57) ABSTRACT

A bypass circuit of an embodiment includes a switch that shorts-circuit between a first power conversion apparatus and a power storage apparatus. The switch is connected in parallel to a second power conversion apparatus. The first power conversion apparatus converts power generated from natural energy and outputs the converted power to a power distribution grid. The second power conversion apparatus converts surplus power that has not been converted by the first power conversion apparatus and charges the power storage apparatus with the converted power; or converts power discharged from the power storage apparatus and supplies the converted power to the first power conversion apparatus.

15 Claims, 14 Drawing Sheets

BYPASS CIRCUIT, POWER SYSTEM CONTROL METHOD, AND NON-TRANSITORY COMPUTER READABLE MEDIUM

CROSS REFERENCE TO RELATED APPLICATIONS

This application is based upon and claims the benefit of priority from the prior Japanese Patent Application No. 2021-150582, filed on Sep. 15, 2021, the entire contents of which are incorporated herein by reference.

FIELD

An embodiment of the present invention relates to a bypass circuit, a power system control method, and a non-transitory computer readable medium.

BACKGROUND

In a natural energy power generation system that generates power by utilizing natural energy such as sunlight, the amount of power generation is unstable because of a variable and unstable nature of the natural energy.

A method for stabilizing the amount of power generation is to construct a large-scale power generation system. Although there are problems caused by installing a large number of power generation systems, there are also solutions thereto that are being studied.

One example is a method in which a power storage system is combined with a natural energy power generation system installed in a small-scale autonomous system (microgrid). This allows the equalization of energy and the stabilization of the frequency and output power of the grid.

Another example is a method of applying an output control principle, which is similar to that of a power generator used in a large-scale power grid, to a power generation inverter using semiconductor which is installed in a microgrid. This allows the stabilization of the frequency and power of a power distribution grid.

Still another example is a method of using an output control principle similar to that of a power generator, for a power control operation of a power generation inverter. This allows the power generation inverter to operate as a virtual synchronous power generator or a virtual synchronous inverter, thereby contributing to the stabilization of a power distribution grid in a microgrid.

Such a natural energy power generation system uses a power generator and an inverter in a manner similar to that in a conventional power generation system and therefore, has a problem of a reduction in an inertial force due to adjustment of output according to the condition of a power distribution grid and limitations of a power conversion speed.

DETAILED DESCRIPTION

A bypass circuit of an embodiment includes a switch that shorts-circuit between a first power conversion apparatus and a power storage apparatus. The switch is connected in parallel to a second power conversion apparatus. The first power conversion apparatus converts power generated from natural energy and outputs the converted power to a power distribution grid. The second power conversion apparatus converts surplus power that has not been converted by the first power conversion apparatus and charges the power storage apparatus with the converted power; or converts power discharged from the power storage apparatus and supplies the converted power to the first power conversion apparatus.

Hereinafter, an embodiment of the present invention will be described with reference to drawings.

Figure 1:
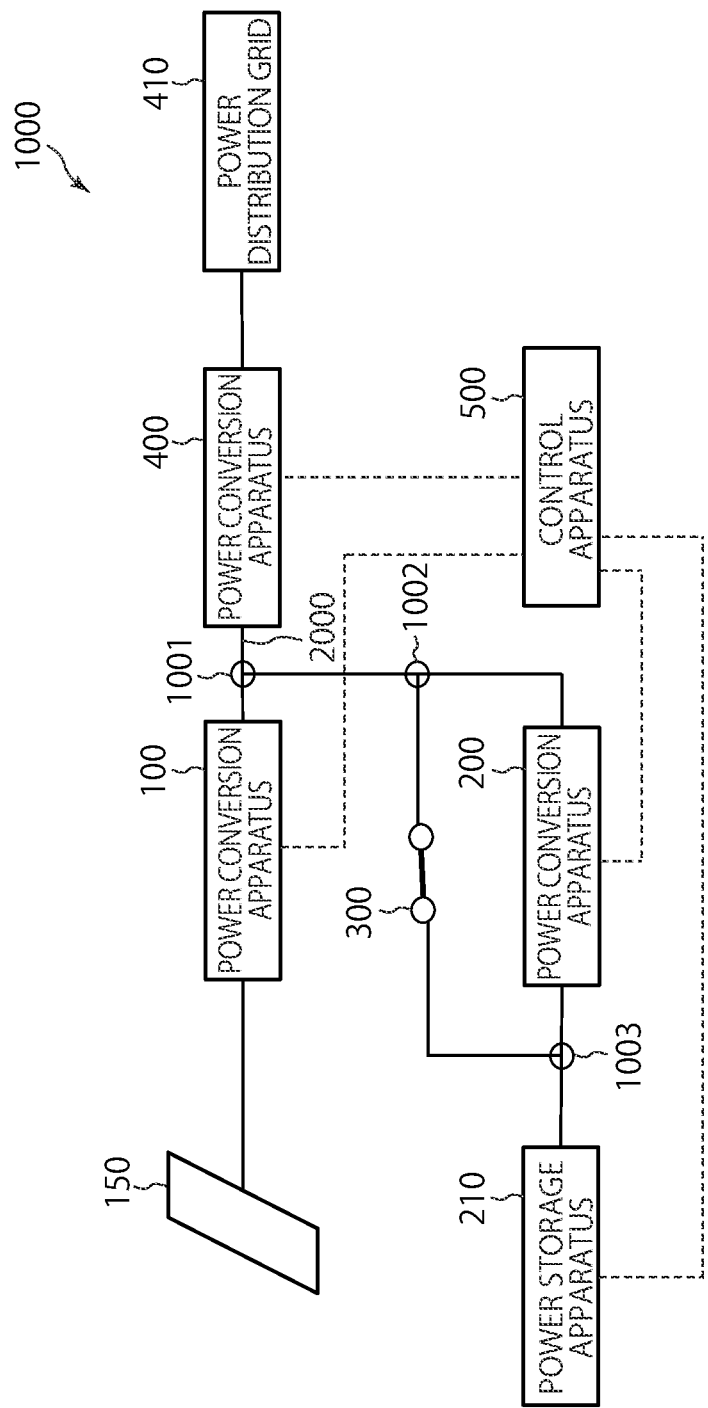
FIG. 1 illustrates an overall system configuration of a power system according to an embodiment.

FIG. 1 illustrates an overall configuration of a power system 1000 according to this embodiment.

In the power system 1000, as indicated by a solid line, a power conversion apparatus 100 and a power conversion apparatus 400 (first power conversion apparatus) are connected by a direct current link 2000. A power conversion apparatus 200 (second power conversion apparatus) is connected with the direct current link 2000 at a contact point 1001. The power conversion apparatus 200 is connected with the power conversion apparatuses 100 and 400 through connection with the direct current link 2000 at the contact point 1001. A bypass circuit 300 is connected in parallel with the power conversion apparatus 200 at contact points 1002 and 1003.

The power conversion apparatus 100 is connected with a solar panel 150. The power conversion apparatus 200 is connected with a power storage apparatus 210. The power conversion apparatus 400 is connected with a power distribution grid 410. A control apparatus 500 (part of a controller) is communicably connected with the power conversion apparatuses 100, 200, and 400, and the power storage apparatus 210, as indicated by a dashed line.

Figure 2:
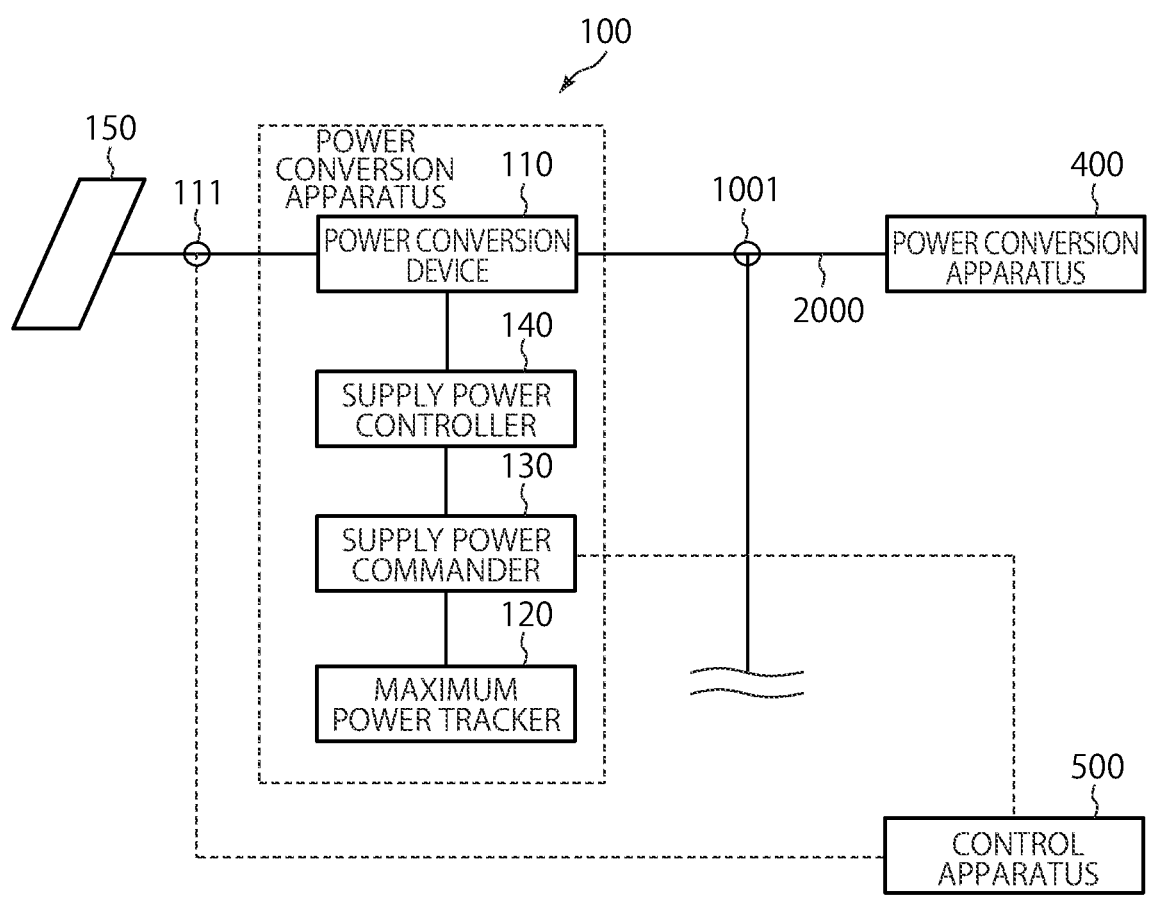
FIG. 2 is a block diagram of a power conversion apparatus and peripheral apparatuses thereof according to the embodiment.

FIG. 2 illustrates a block diagram of the power conversion apparatus 100 and peripheral apparatuses thereof according to the embodiment. The power conversion apparatus is one constitution of the PV inverter that converts electric power generated by a solar panel 150 to the direct current electricity and is also called a power conditioning system (PCS).

The power conversion apparatus 100 converts power generated by the solar panel 150 and supplies the converted power to the direct current link 2000. The power supplied to the direct current link 2000 becomes power to be output by the power conversion apparatus 400 to the power distribution grid 410.

The power conversion apparatus 100 is a direct current to direct current (DC-DC) converter as the output of power generated by the solar panel 150 is direct current.

The power conversion apparatus 100 performs conversion under maximum power point tracking (MPPT) control so as to supply the maximum power according to conditions such as the installation location of the solar panel 150 and weather. The power conversion apparatus 100 supplies power including surplus power that is not converted by the power conversion apparatus 400, to the direct current link 2000. The power conversion apparatus 100 prevents power supplied to the direct current link 2000 from flowing back to the solar panel 150.

The power conversion apparatus 100 includes a power conversion device 110, a maximum power tracker 120, a supply power commander 130, and a supply power controller 140.

In this embodiment, the power conversion apparatus 100 takes out power by using, as a natural energy power generation apparatus, the solar panel 150 that converts sunlight into power; however, it may take out power from another natural energy. For example, a wind turbine that takes out power from wind power or a water turbine that takes out power from flow of water such as ocean currents may be used.

The power conversion device 110 is an electronic device that converts power supplied from the solar panel 150 into the direct current link 2000 power. The power conversion device 110 converts power generated by the solar panel 150 under the maximum power point tracking (MPPT) control. The power conversion device 110 is the direct current to direct current (DC-DC) converter.

The maximum power tracker 120 calculates a voltage indicating the maximum power point for the power conversion device 110 to perform the MPPT control.

The power conversion apparatus 100 converts the power generated by the solar panel 150 under the MPPT control, as described later.

In conversion under the MPPT control, it is necessary to obtain the maximum power point where power generated by the solar panel 150 is the maximum.

The maximum power point varies according to weather conditions such as the amount of sunlight exposed to the solar panel 150. The maximum power tracker 120 obtains the maximum power point so as to correspond to varying weather conditions. The maximum power tracker 120 calculates a voltage and a current for conversion by the power conversion device 110, based on the maximum power point.

The supply power commander 130 transmits a command to perform power conversion with the voltage and current that are obtained by the maximum power tracker 120, to the supply power controller 140. The supply power commander 130 is connected with the maximum power tracker 120 and the supply power controller 140.

The supply power commander 130 is also communicably connected with the control apparatus 500, as indicated by a dashed line.

The supply power commander 130 may transmit a command to perform power conversion with anything other than the voltage and current that are obtained by the maximum power tracker 20, to the supply power controller 140. For example, the command may be based on a later-described power command value that is transmitted from the control apparatus 500.

The supply power controller 140 controls the power conversion device 110 based on the command received from the supply power commander 130.

Figure 3:
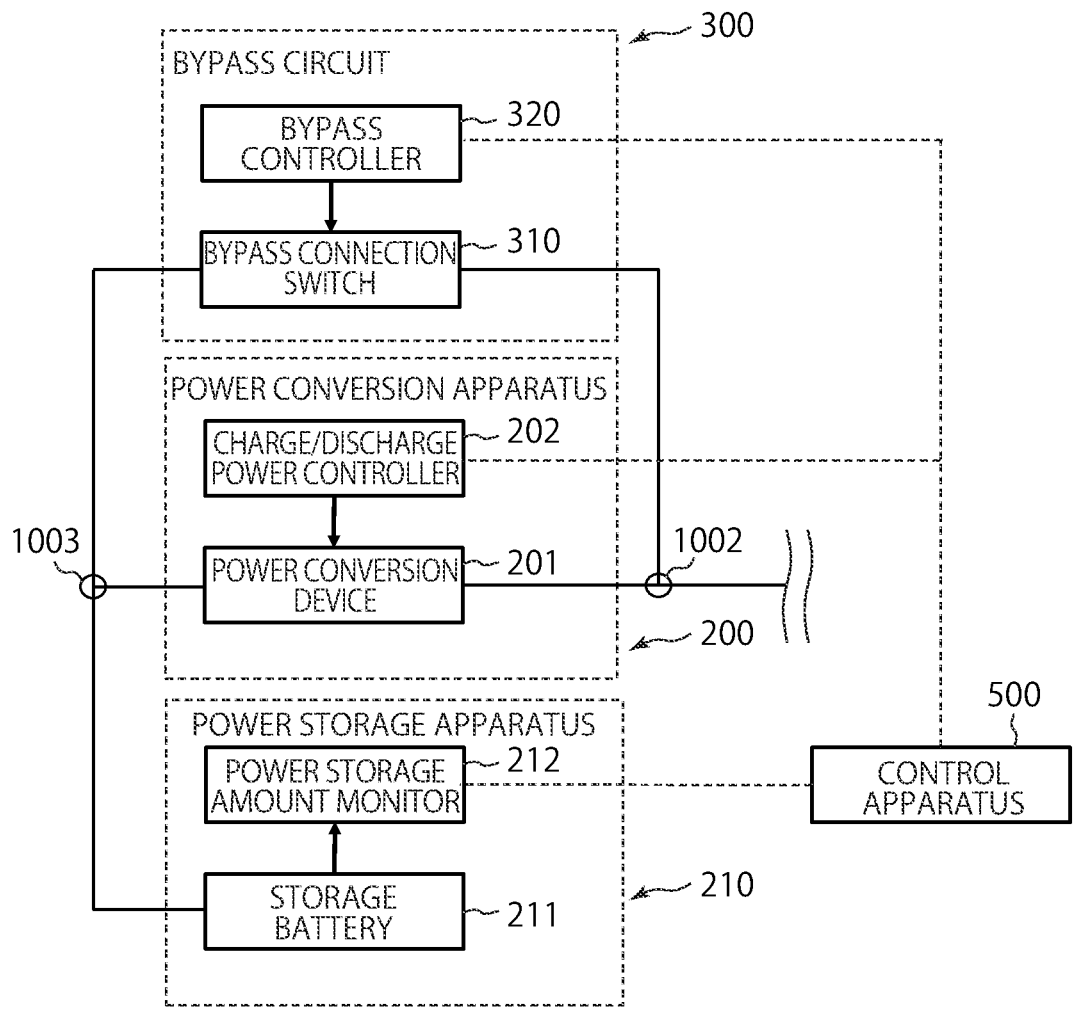
FIG. 3 is a block diagram of the power conversion apparatus, a power storage apparatus, and a bypass circuit according to the embodiment.

FIG. 3 illustrates a block diagram of the power conversion apparatus 200, the power storage apparatus 210, and the bypass circuit 300 according to the embodiment.

The power conversion apparatus 200 performs power conversion so as to charge the power storage apparatus 210 with surplus power of the output of the power conversion apparatus 100 which exceeds a power demand and to discharge, when the demand from the power distribution grid 410 increases, the power from the power storage apparatus 210.

The power conversion apparatus 200 is a direct current to direct current (DC-DC) converter as the power storage apparatus 210 of direct current performs charging/discharging for the direct current link 2000.

The power conversion apparatus 200 switches the direction of conversion according to whether to perform charging or discharging of the power storage apparatus 210. For example, when charging the power storage apparatus 210, the power conversion apparatus 200 transmits power of the direct current link 2000 to the power storage apparatus 210 and prevents a backflow from the power storage apparatus 210 to the direct current link 2000. For example, when discharging power from the power storage apparatus 210, the power conversion apparatus 200 transmits power of the power storage apparatus 210 to the direct current link 2000 and prevents a backflow from the direct current link 2000 to the power storage apparatus 210.

The power conversion apparatus 200 includes a power conversion device 201 and a charge/discharge power controller 202 (part of controller).

The power conversion device 201 is a bidirectional power converter that bidirectionally performs power conversion for controlling the amount of power conversion between the direct current link 2000 and the power storage apparatus 210. The power conversion device 201 is also called a storage battery controller and controls the amount of charging to the power storage apparatus 210 and the amount of discharge from the power storage apparatus 210.

The charge/discharge power controller 202 controls the power conversion device 201 to switch between charging the power storage apparatus 210 and discharging power to the power conversion apparatus 400 by the power conversion device 201. In charging the power storage apparatus 210, the charge/discharge power controller 202 controls the power conversion device 201 to perform conversion for the power from the direct current link 2000 to the power storage apparatus 210. In discharging power from the power storage apparatus 210, the charge/discharge power controller 202 controls the power conversion device 201 to perform conversion for the power from the power storage apparatus 210 to the direct current link 2000.

The charge/discharge power controller 202 is communicably connected with a control apparatus 500. The charge/discharge power controller 202 determines according to a control command from the control apparatus 500 whether to charge the power storage apparatus 210 or to discharge power from the power storage apparatus 210.

The power storage apparatus 210 is charged with and stores surplus power that has not been converted by the power conversion apparatus 400, out of the power generated by the power conversion apparatus 100. When an abrupt load variation occurs in the power distribution grid 410 and when power to be converted is insufficient in the power conversion apparatus 400, the power storage apparatus 210 discharges stored power.

The power storage apparatus 210 includes a storage battery 211 and a power storage amount monitor 212.

Although, in this embodiment, the power storage apparatus 210 is a secondary battery capable of repeatedly charging and discharging, it may be any other kind of apparatus that can store power, such as a power storage system including a plurality of capacitors, for example.

The storage battery 211 is a lithium ion secondary battery that is charged with power. Although, in this embodiment, the storage battery 211 is a lithium ion secondary battery, it may be any other kind of secondary battery. For example, it may be a lead-acid battery or a nickel-cadmium secondary battery.

The power storage amount monitor 212 transmits power information such as the amount of power stored in the storage battery 211, to the control apparatus 500. The power storage amount monitor 212 is communicably connected with the control apparatus 500. The transmitted power information is used for calculating, for example, a power command value that is to be transmitted to the power conversion apparatus 200 by the control apparatus 500.

The bypass circuit 300 is a mechanical contact point and is opened and closed, which performs control to directly connect the power storage apparatus 210 and the direct current link 2000.

Although, in this embodiment, the bypass circuit 300 controls connection between the power storage apparatus 210 and the direct current link 2000 by mechanically opening and closing the contact point, the connection may be controlled by opening and closing a semiconductor element, for example, a switching element. The bypass circuit 300 includes a bypass connection switch 310 and bypass controller 320. Alternatively, the connection may be controlled by opening and closing a switching element of the power conversion device 201.

The bypass connection switch 310 is a switch that is connected in parallel with the power conversion apparatus 200 at the contact points 1002 and 1003. The bypass connection switch 310 is opened and closed according to a control command from the bypass controller 320 being connected, thereby controlling a direct connection between the power storage apparatus 210 and the direct current link 2000.

The bypass controller 320 controls the bypass connection switch 310 to open and close the bypass circuit 300. The bypass controller 320 is communicably connected with the control apparatus 500. The bypass controller 320 receives a command to open or close the bypass connection switch 310 from the control apparatus 500; and opens or closes the bypass connection switch 310 based on the command.

Figure 4:
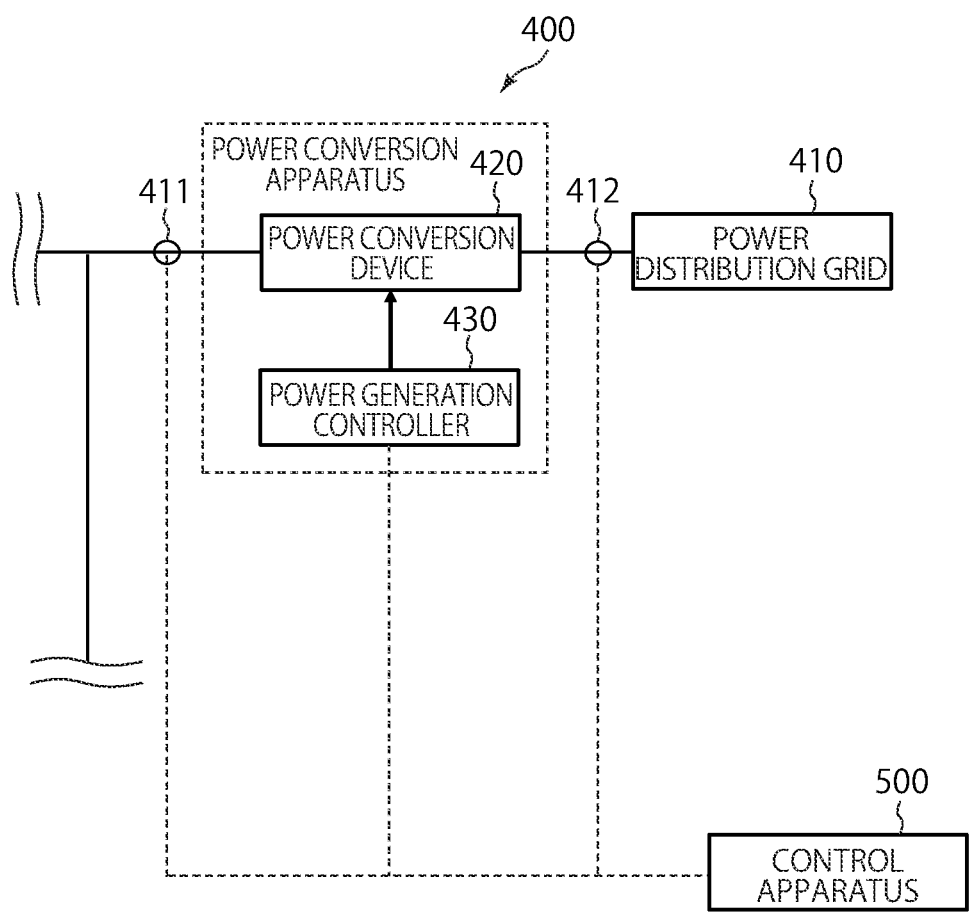
FIG. 4 is a block diagram of a power conversion apparatus and peripheral apparatuses thereof according to the embodiment.

FIG. 4 illustrates a block diagram of the power conversion apparatus 400 and peripheral apparatuses thereof according to the embodiment.

The power conversion apparatus 400 converts power generated by the solar panel 150, which is output by the power conversion apparatus 100, and outputs it to the power distribution grid 410. When power to be output to the power distribution grid 410 is insufficient, the power conversion apparatus 400 also converts power discharged from the power storage apparatus 210, which is output by the power conversion apparatus 100, and outputs it.

The power conversion apparatus 400 prevents power output to the power distribution grid 410 from flowing back to the power conversion apparatuses 100 and 200 via the direct current link 2000.

The power conversion apparatus 400 also can convert power from the power distribution grid 410 so that the power storage apparatus 210 can be charged with power from the power distribution grid 410 via the direct current link 2000. This allows the power storage apparatus 210 to be charged with, for example, power in night time when there is low prices and low demand.

The power conversion apparatus 400 is a bidirectional direct-current to alternating current (DC-AC) converter since the power supplied from the direct current link 2000 and the power stored in the power storage apparatus 210 are direct current and power in the power distribution grid 410 is alternating current.

The power conversion apparatus 400 uses an output control principle similar to that of a power generator, for a power control operation of a power generation inverter. This allows the power generation inverter to operate as a virtual synchronous power generator or a virtual synchronous inverter.

In outputting alternating current power, the power conversion apparatus 400 may be connected with the power distribution grid 410 through a harmonic elimination filter and a grid-connected inductor, and a switch.

The power conversion apparatus 400 includes a power conversion device 420 and a power generation controller 430.

The power conversion device 420 is an electronic device that converts power supplied from the direct current link 2000 into alternating current power, thereby generating and outputting power used in the power distribution grid 410. The power conversion device 420 is the direct current to alternating current (DC-DC) converter.

The power generation controller 430 controls the power conversion device 420 based on a command received from the control apparatus 500.

Figure 5:
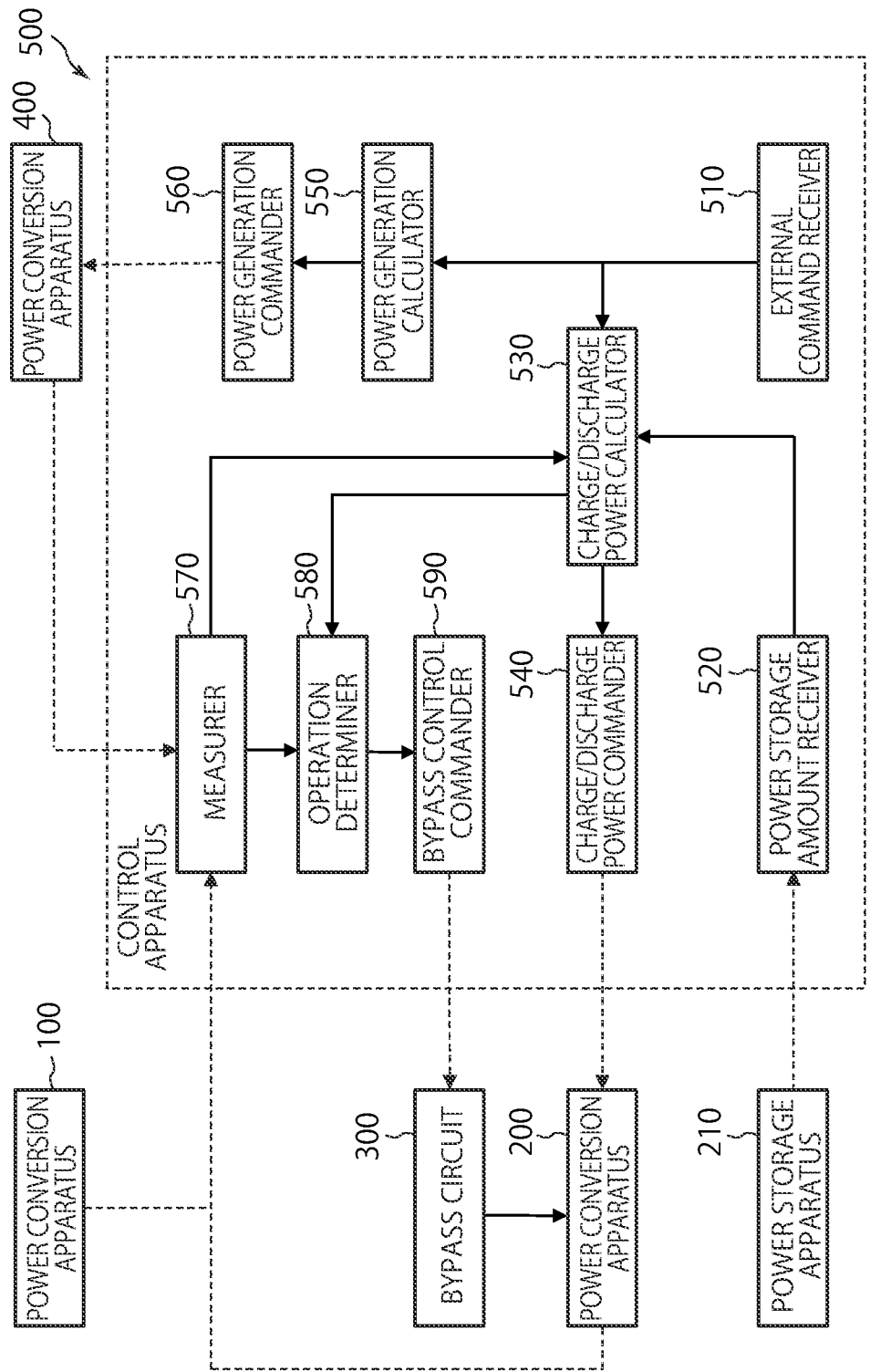
FIG. 5 is a block diagram of a control apparatus according to the embodiment.

FIG. 5 illustrates a block diagram of the control apparatus 500 according to the embodiment.

The control apparatus 500 controls the entire power system 1000. The control apparatus 500 includes: a semiconductor integrated circuit having arithmetic functions such as a microcontroller unit (MCU) and a digital signal processing unit (DSP); and an electronic circuit in which software having control procedures described therein is converted into executable code and stored in a memory. The power system 1000 is controlled by executing the software stored in the memory, on the semiconductor integrated circuit based on operation information. Here, the operation information is obtained through: information from various sensors that are installed to protect apparatuses, such as measurement sensors performing voltage measurement, current measurement, and the like for the apparatuses; and communication with an external control apparatus and the power storage apparatus 210.

The control apparatus 500 adds the operation of a virtual synchronous power generator to the power system 1000 by incorporation and implementation of an algorithm for synchronization with the power distribution grid 410 into an operation control by the control software.

The control apparatus 500 includes an external command receiver 510, a power storage amount receiver 520, a charge/discharge power calculator 530, a charge/discharge power commander 540, a power generation calculator 550, a power generation commander 560, a measurer 570, an operation determiner 580, and a bypass control commander 590.

The control apparatus 500 is communicably connected with the power conversion apparatuses 100, 200, and 400, the bypass circuit 300, and the power storage apparatus 210.

The external command receiver 510 receives an output power amount command and an operation state command for the power system 1000. The output power amount command and the operation state command are transmitted from, for example, a higher-level control system that controls the power distribution grid 410. The output power amount command and the operation state command control the power that is output by the power system 1000, namely, the power that is output by the power conversion apparatus 400, based on the state of the power distribution grid 410.

The external command receiver 510 transmits the commands to the charge/discharge power calculator 530 and the power generation calculator 550.

The power storage amount receiver 520 is communicably connected with the power storage apparatus 210 and receives power information of the power storage apparatus 210. The power storage amount receiver 520 transmits the received power information to the charge/discharge power calculator 530.

The charge/discharge power calculator 530 calculates power to be stored in or discharged from the power storage apparatus 210. The power is based on the output power amount command transmitted from the external command receiver 510 and the power information of the power storage apparatus 210 which is received from the power storage amount receiver 520. The charge/discharge power calculator 530 transmits a result to the charge/discharge power commander 540 and the operation determiner 580.

The charge/discharge power commander 540 transmits a command to perform charging or discharging to the power conversion apparatus 200 based on the calculation result received from the charge/discharge power calculator 530. The command controls whether to charge the power storage apparatus 210 or to discharge power from the apparatus.

The power generation calculator 550 calculates the power that is to be output to the power distribution grid 410 by the power conversion apparatus 400, based on the command received from the external command receiver 510; and transmits a calculation result to the power generation commander 560.

The power generation commander 560 transmits a command to the power conversion apparatus 400 based on the calculation result received from the power generation calculator 550.

The measurer 570 aggregates the results obtained by measuring the voltage, current, power, and frequency of each apparatus and each circuit in the power system 1000 by using a sensor installed in each circuit. The measurer 570 obtains by measurement, for example, power information such as voltage at a contact point 111 in FIG. 2 at the time of input in the power conversion apparatus 100.

The measurer 570 obtains by measurement, for example, power information such as voltage at contact points 411 and 412 in FIG. 4 at the time of input and output in the power conversion apparatus 400.

The measurer 570 may obtain, by measurement, information from an apparatus other than a sensor directly installed in the circuit. For example, the measurer 570 may use information obtained by the power storage amount monitor 212, as power information.

The measurer 570 transmits the obtained information to the operation determiner 580.

The operation determiner 580 determines the necessity of bypass control from the power information obtained by the measurer 570 and the calculation result of the charge/discharge power calculator 530. The operation determiner 580 transmits a determination result to the bypass control commander 590.

The bypass control commander 590 transmits a determination result to the bypass circuit 300. The bypass circuit 300 controls the opening and closing thereof based on the determination result, to perform control to directly connect the power storage apparatus 210 and the direct current link 2000.

Figure 6:
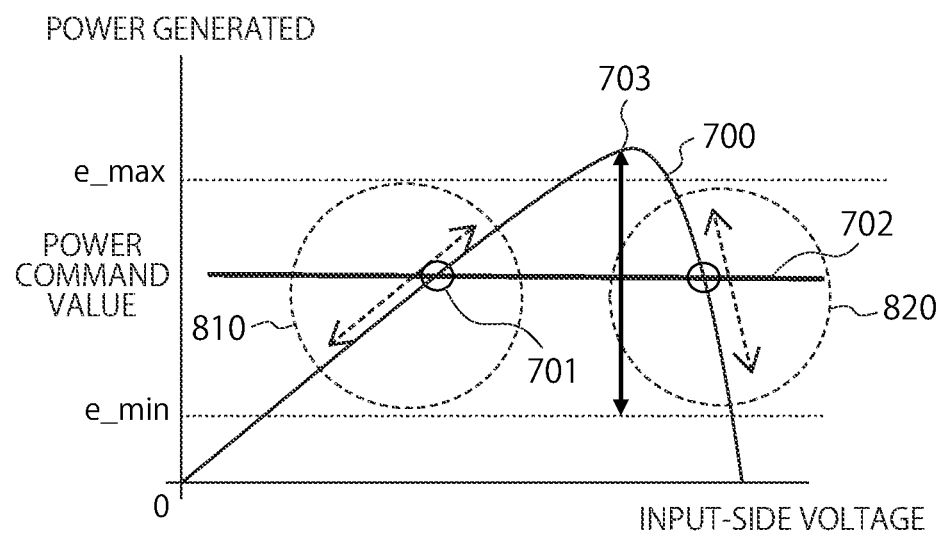
FIG. 6 is a graph illustrating a relationship between power generated by a solar panel exposed to a given amount of solar radiation and a terminal voltage.
Figure 7:
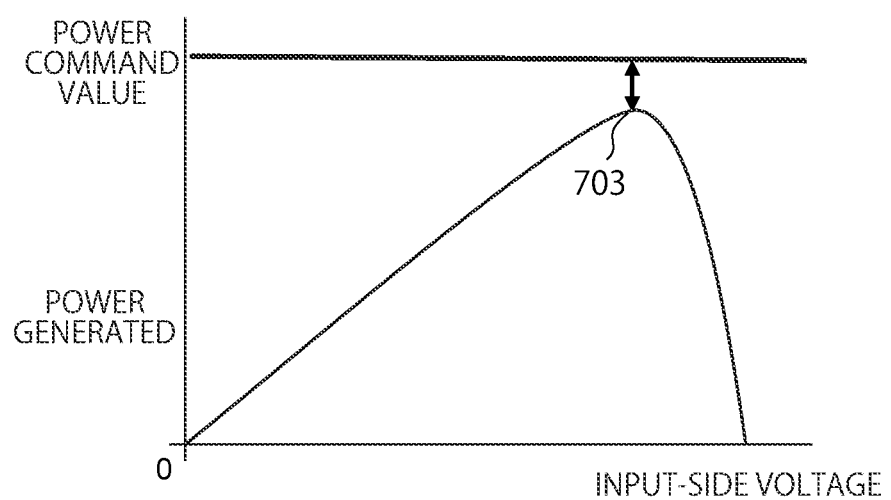
FIG. 7 is a graph illustrating a case where a power command value illustrated in FIG. 6 exceeds a maximum power point.

FIG. 6 is a graph 700 illustrating a relationship between the power generated by the solar panel 150 exposed to a given amount of solar radiation and an input-side voltage. FIG. 7 is a graph illustrating a case where a power command value illustrated in FIG. 6 exceeds the maximum power point.

The power system 1000 converts sunlight incident on the solar panel 150 into power and supplies it to the power distribution grid 410.

The power that is output by the power conversion apparatus 400 to the power distribution grid 410 varies according to load variations due to power demand.

The power that is output to the power distribution grid 410 is indicated as a power command value from an external power distribution grid monitor, for example, a higher-level control system that manages the power distribution grid 410. Although the power command value is information indicating power that is to be output to the power distribution grid 410 by the power conversion apparatus 400, it also includes information other than the power. For example, it additionally includes a voltage command value commanding a voltage, a power generation command value commanding power to be generated, and a frequency command value commanding a frequency.

Since a load varies every moment according to power demand, the power command value also varies every moment.

The power to be supplied to the power conversion apparatus 400 is supplied from the direct current link 2000. The power to be supplied to the direct current link 2000 is generated through the power conversion apparatus 100 from sunlight incident on the solar panel 150.

If the power system 1000 does not include the power conversion apparatus 100 and directly transmits power from the solar panel 150 to the power conversion apparatus 400, the power conversion apparatus 400 outputs power based on the power command value. More specifically, as in FIG. 6, it outputs power at voltages at intersections 701 and 702 where the voltage command value and the graph 700 intersect with each other.

The power command value varies according to load variations due to power demand. For example, assume that the power command value varies from the minimum value (e_min) to the maximum value (e_max). In this case, power that is to be output by the power conversion apparatus 400 varies based on the variations of the power command value within regions 810 and 820 as variable areas, as indicated with dashed arrows illustrated in FIG. 6, so that the power to be output is adjusted.

In the graph 700, the generated power is the maximum at a vertex 703. In other words, the vertex 703 indicates the maximum power point in the MPPT control.

In either case of outputting power using voltage at the intersection 701 or 702, the output power of the power conversion apparatus 400 does not reach the power obtained when conversion is performed with a voltage indicated by the vertex 703 that is the maximum power point.

The power conversion apparatus 400 disposes of part of power that can be generated by the solar panel 150 and therefore, the power generation efficiency, namely, the operation efficiency of the power system 1000 is reduced.

To solve the above-described problem, the power system 1000 uses the power conversion apparatus 100 that converts the output of the solar panel 150.

The power conversion apparatus 100 converts the output of the solar panel 150 under the MPPT control. Power other than the power necessary for the power distribution grid 410 which is converted by the power conversion apparatus 400, out of the power converted by the power conversion apparatus 100, is used for charging the power storage apparatus 210 as surplus power. Thus, the output of the solar panel 150 is used for another purpose than as output to the power distribution grid 410, thereby allowing an improvement in the operation efficiency.

The power stored in the power storage apparatus 210 is used when the power command value indicates a value larger than that at the vertex 703 as in FIG. 7. For example, it is used when power demand in the power distribution grid 410 is more than the power generation capacity of the solar panel 150. In this case, the power command value exceeds the maximum value (e_max) illustrated in FIG. 6.

If nothing is done, the power that can be output by the power conversion apparatus 400 is less than the power based on the demand of the power distribution grid which is indicated by the power command value. The power conversion apparatus 400 outputs the power together with power discharged by the power storage apparatus 210, thereby outputting the power indicated by the power command value to the power distribution grid 410.

Figure 8A:
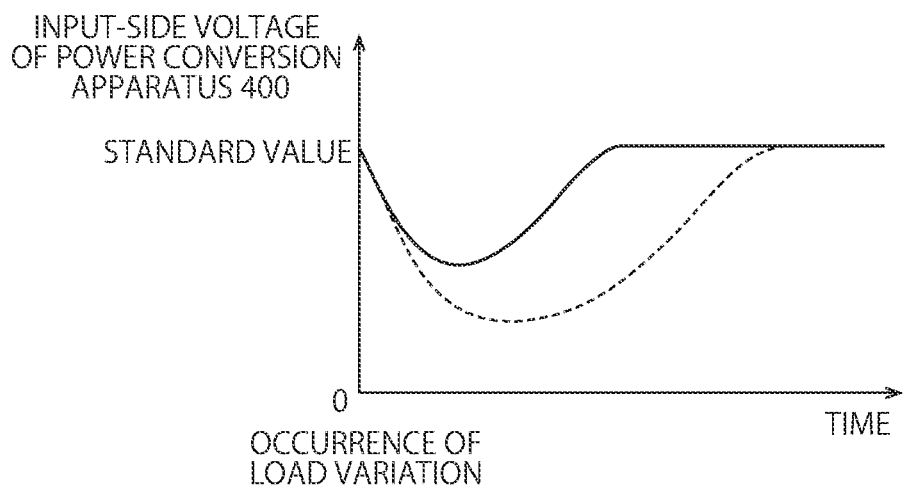
FIGS. 8A and 8B are graphs each illustrating a change in voltage over time due to load variations of a power distribution grid.
Figure 8B:
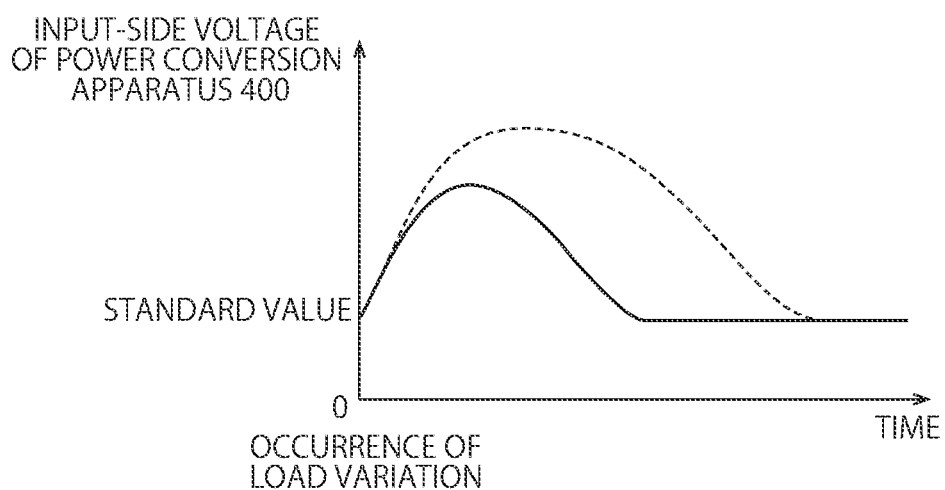

FIGS. 8A and 8B illustrate graphs each indicating a change in voltage over time due to load variations of the power distribution grid 410.

When a load in the power distribution grid 410 abruptly increases, power to be output to the power distribution grid 410 cannot be maintained only by an inertia force of the power conversion apparatus 400 including a PCS.

This brings the power distribution grid 410 into a state of power shortage. As indicated by a dashed line in FIG. 8A, the voltage of the power distribution grid 410 decreases below a standard value based on a power command value due to drooping characteristics, which causes an input-side voltage of the power conversion apparatus 400 also to be lowered. After that, the lowered voltage increases to the standard value or a value close thereto by power control of the power conversion apparatus 400 and is stabilized.

In such a change, the power conversion apparatus 400 cannot maintain power to be output during a power shortage period of the power distribution grid 410, causing a drop of the input-side voltage connected with the direct current link 2000. That is, a voltage of the direct current link 2000 becomes lower than that of the power storage apparatus 210.

The power system 1000 shorts the bypass circuit 300 to make a direct connection between the power storage apparatus 210 and the direct current link 2000.

Note that since the power conversion apparatus 100 prevents a backflow from the direct current link 2000 to the solar panel 150, electricity does not flow from the direct current link 2000 to the solar panel 150.

Thus, as indicated by a solid line in FIG. 8A, the time taken before the lowered voltage increases to the standard value or a value close thereto and is stabilized can be reduced.

Here, the voltage of the power storage apparatus 210 is higher than the input-side voltage of the power conversion apparatus 400. That is, the power stored in the power storage apparatus 210 flows into the power conversion apparatus 400 of a low voltage and is thus discharged. In this case, the power in the power storage apparatus 210 does not flow back to the power storage apparatus 210 due to voltage differences from the power conversion apparatus 100 and direct current link 2000.

When a load in the power distribution grid 410 abruptly decreases, it is necessary to limit the power to be output to the power distribution grid 410.

In this case, the power distribution grid 410 has a surplus power and as indicated by a dashed line in FIG. 8B, the voltage of the power distribution grid 410 increases above the standard value based on the power command value, which causes the input-side voltage of the power conversion apparatus 400 to increase, contrary to the case of FIG. 8A. After that, the increased voltage decreases to the standard value or a value close thereto by power control of the power conversion apparatus 400 and is stabilized.

The power system 1000 shorts the bypass circuit 300 to make a direct connection between the power storage apparatus 210 and the direct current link 2000.

This makes it possible to reduce the time taken before the increased voltage decreases to the standard value or a value close thereto and is stabilized, as indicated by a solid line in FIG. 8B.

Here, the voltage of the power storage apparatus 210 is lower than the input-side voltage of the power conversion apparatus 400. That is, the power of the direct current link 2000 flows into the power storage apparatus 210 of a low voltage and is stored in the power storage apparatus 210. In this case, the power in the power storage apparatus 210 does not flow back to the direct current link 2000 due to voltage differences from the power conversion apparatus 100 and the direct current link 2000.

In either case, in order to short the bypass circuit 300 and make a direct connection between the power storage apparatus 210 and the direct current link 2000, it is necessary to consider the power stored in the power storage apparatus 210.

For example, when the power storage apparatus 210 does not have any stored power, the power output by the power conversion apparatus 400 does not increase even by shorting the bypass circuit 300 to directly connect the power storage apparatus 210 and the direct current link 2000. On the contrary, the power in the direct current link 2000 flows back to the power storage apparatus 210, causing a reduction in the power output of the power conversion apparatus 400.

For example, when the power storage apparatus 210 is fully charged, the power output by the power conversion apparatus 400 does not decrease even by shorting the bypass circuit 300 to directly connect the power storage apparatus 210 and the direct current link 2000. On the contrary, the power in the power storage apparatus 210 flows back to the direct current link 2000, causing an increase in the power output of the power conversion apparatus 400.

In the power system 1000 of the embodiment, the control apparatus 500 and the bypass controller 320 connected to the control apparatus 500 are used to control the opening and closing of the bypass circuit 300; however, any other apparatuses that can perform control based on, for example, the power storage amount of the power storage apparatus 210 may be used.

A change in voltage according to load variations of the power distribution grid 410 has been described with reference to FIG. 8 and furthermore in the power system 1000 of the embodiment, it is necessary to consider the frequency of power that is output by the power conversion apparatus 400.

For example, when a load in the power distribution grid 410 abruptly increases, the alternating current frequency of the power distribution grid 410 decreases; on the other hand, when a load in the power distribution grid 410 abruptly decreases, the alternating current frequency of the power distribution grid 410 increases.

In either case, by also considering the alternating current frequency of the output of the power conversion apparatus 400, a phase difference with respect to the power distribution grid 410 can be eliminated and an increase or decrease in a voltage caused thereby can be prevented.

Figure 9:
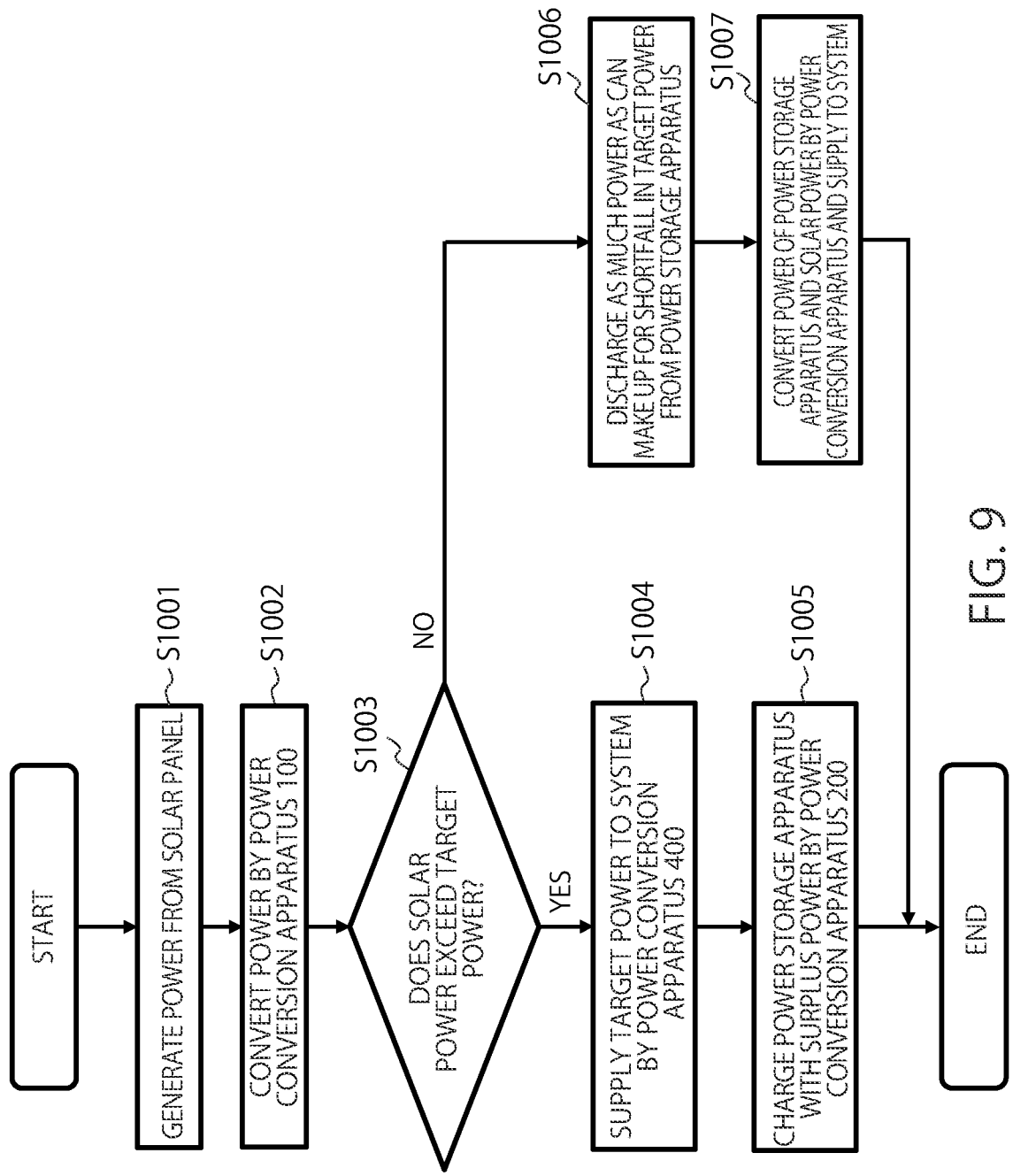
FIG. 9 is a flowchart schematically illustrating power supply to the power distribution grid in the power system according to the embodiment.

FIG. 9 is a flowchart schematically illustrating the operation of the power system 1000 according to the embodiment in performing output to the power distribution grid 410.

To begin with, described is a case where the power system 1000 supplies an output of the solar panel 150 to the power distribution grid 410.

First, the solar panel 150 generates direct current power from sunlight (S1001). Then, the power conversion apparatus 100 converts the generated direct current power into alternating current power (S1002).

The control apparatus 500 determines whether the power generated by the solar panel 150 exceeds the target power indicated by the power command value (S1003). In the case of exceeding, a process advances to S1004 and in the case of not exceeding, the process advances to S1006.

In the case of exceeding the indicated power, the power conversion apparatus 400 outputs as much power as the indicated power to the power distribution grid 410 (S1004). At this time, a surplus power of the generated solar power is stored in the power storage apparatus 210 through the power conversion apparatus 200 (S1005).

In the case of not exceeding the indicated power, the power storage apparatus 210 discharges as much power as can make up for a shortfall in target power, from the storage battery 211 (S1006). The power conversion apparatus 400 outputs the power discharged from the power storage apparatus 210 and the power generated by the solar panel 150 together to the power distribution grid 410 (S1007).

Figure 10:
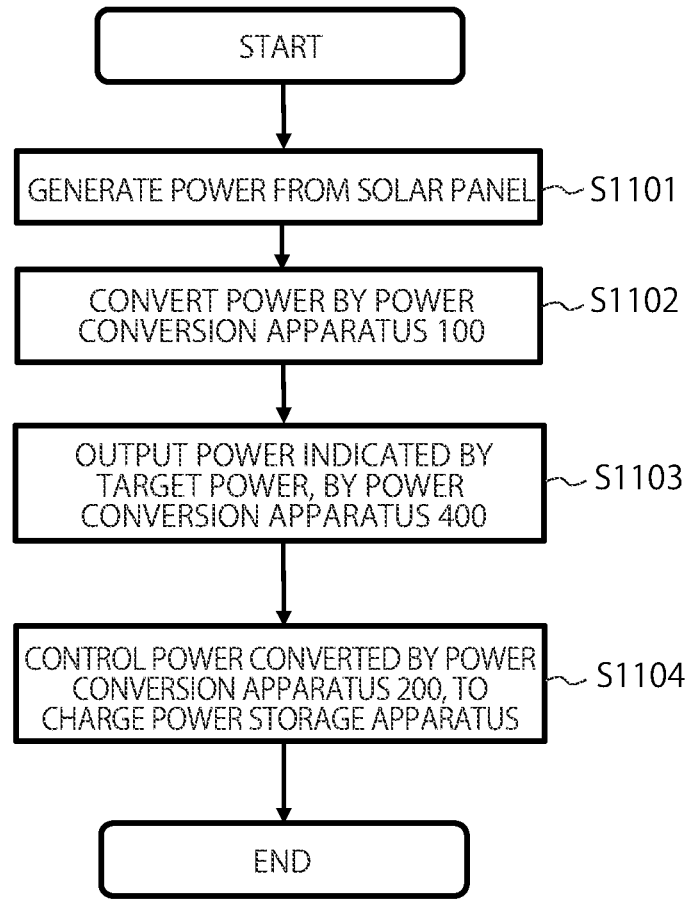
FIG. 10 is a flowchart schematically illustrating an operation in the case of charging the power storage apparatus while outputting power to the power distribution grid in the power system according to the embodiment.

FIG. 10 is a flowchart schematically illustrating an operation in the case of charging the power storage apparatus 210 while outputting power to the power distribution grid 410 in the power system 1000 according to the embodiment.

Described next is a case where the solar panel 150 generates sufficient power and the power system 1000 charges the power storage apparatus 210 while outputting power to the power distribution grid 410 so as to keep the amount of charging the power storage apparatus 210 constant.

First, the solar panel 150 generates direct current power from sunlight (S1101). Then, the power conversion apparatus 100 converts the direct current power generated from sunlight into alternating current power (S1102).

The power conversion apparatus 400 outputs power indicated by the target power (S1103).

The power conversion apparatus 200 controls power to be output according to the power generated by the solar panel 150, to charge the power storage apparatus 210 (S1104).

Figure 11:
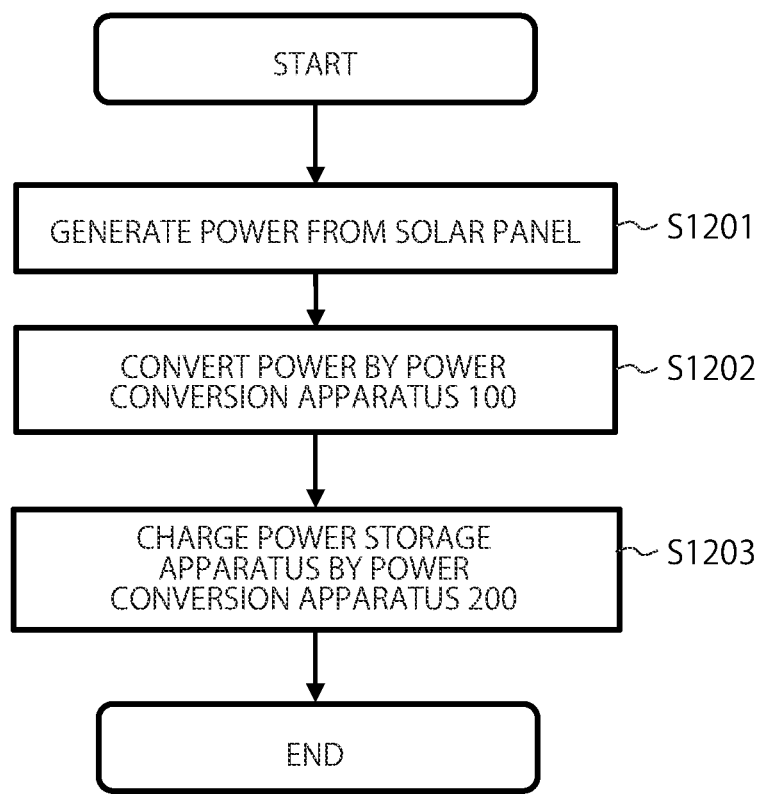
FIG. 11 is a flowchart schematically illustrating a case where all the power generated is used to charge the power storage apparatus.

FIG. 11 is a flowchart schematically illustrating a case where all the power generated is used to charge the power storage apparatus 210.

Described next is a case where the power system 1000 stores all the output of the solar panel 150 in the power storage apparatus 210.

First, the solar panel 150 generates power from sunlight (S1201). Then, the power conversion apparatus 100 converts the direct current power generated from sunlight into direct current power (S1202).

The power conversion apparatus 200 converts the converted power again and stores it in the power storage apparatus 210 with it (S1203).

Figure 12:
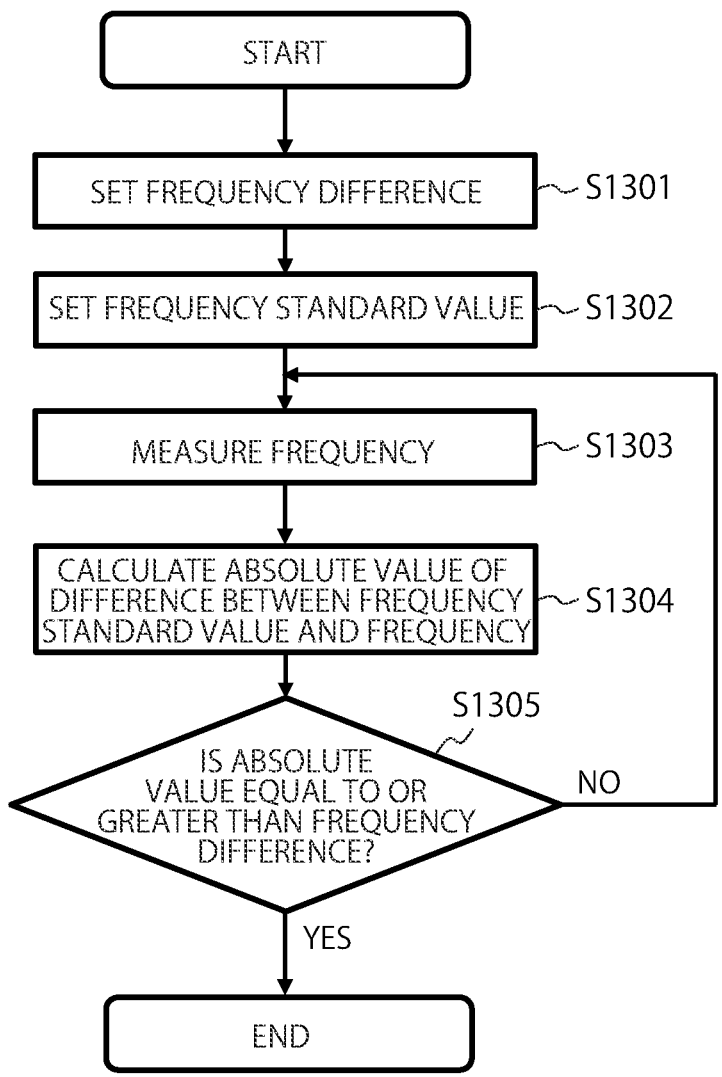
FIG. 12 is a flowchart schematically illustrating the operation of determining a frequency in the case of causing a bypass circuit to perform a bypass operation.

FIG. 12 is a flowchart schematically illustrating the operation of determining a frequency in causing the bypass circuit 300 to perform a bypass operation.

First, the bypass control commander 590 defines a start frequency difference and an end frequency difference in the bypass operation as operation variables of the control apparatus 500 (S1301). Here, the start frequency difference is a difference between the frequency of the power distribution grid 410 when the bypass operation starts and a standard value described later (first frequency and standard frequency). The end frequency difference is a difference between the frequency of the power distribution grid 410 when the bypass operation ends and the standard value described later.

Next, the external command receiver 510 defines as an operation variable of the control apparatus 500, a standard value of the frequency that is output by the power conversion apparatus 400, based on a received power command value (S1302).

The measurer 570 measures the frequency of the power distribution grid 410 (S1303). The frequency of the power distribution grid 410 is a frequency of power output by the power conversion apparatus 400, which is measured by a sensor installed at the contact point 412.

The operation determiner 580 calculates an absolute value of a difference between the measured frequency of the power distribution grid 410 and the standard value (S1304).

Next, the operation determiner 580 determines whether the calculated absolute value is equal to or greater than the start frequency difference (S1305). If it is equal to or greater than the start frequency difference, the process ends; and if it is smaller than the frequency, the process returns to S1303.

Figure 13:
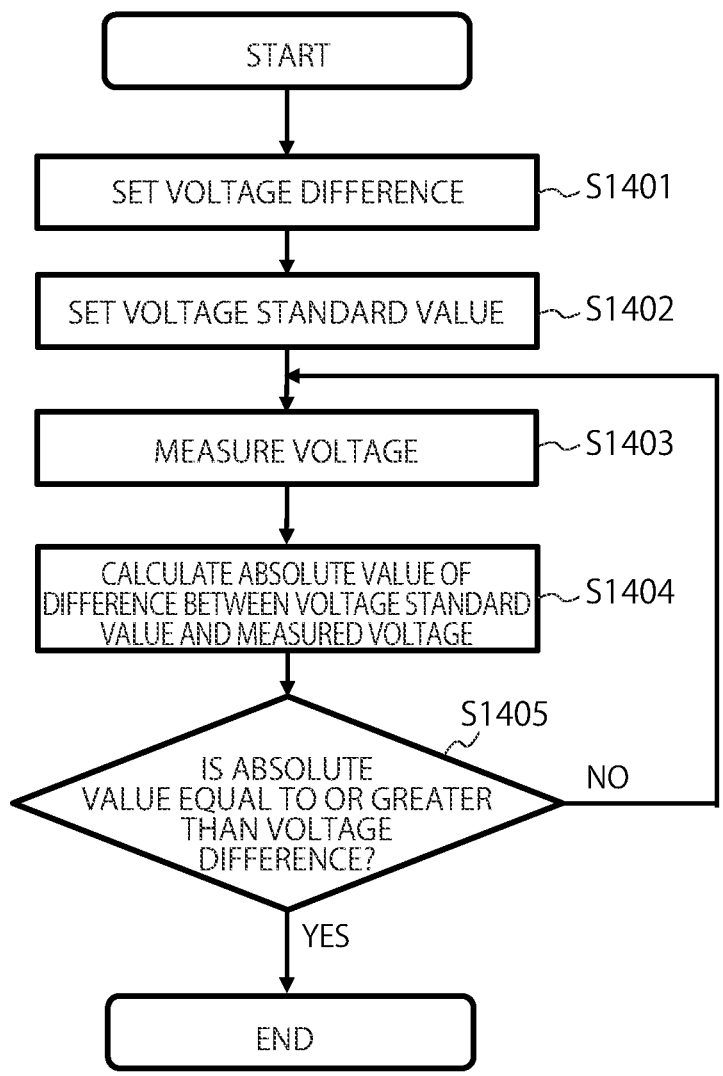
FIG. 13 is a flowchart schematically illustrating the operation of determining a voltage in the case of causing the bypass circuit to perform a bypass operation.

FIG. 13 is a flowchart schematically illustrating the operation of determining a voltage in causing the bypass circuit to perform a bypass operation.

First, the bypass control commander 590 defines a start voltage difference and an end voltage difference in the bypass operation as operation variables of the control apparatus 500 (S1401). Here, the start voltage difference is a difference between the input-side voltage of the power conversion apparatus 400, which is the voltage of the direct current link 2000 when the bypass operation starts, and a standard value described later (first voltage and standard voltage). The end voltage difference is a difference between the input-side voltage of the power conversion apparatus 400 when the bypass operation ends and the standard value described later.

Next, the external command receiver 510 defines as an operation variable of the control apparatus 500, a standard value of the input-side voltage of the power conversion apparatus 400, based on a received power command value (S1402).

The measurer 570 measures the voltage of the power distribution grid 410 (S1403). The input-side voltage of the power conversion apparatus 400 is a voltage that is measured by a sensor installed at the contact point 411.

The operation determiner 580 calculates a difference absolute value (difference) of a difference between the measured input-side voltage of the power conversion apparatus 400 and the standard value (S1404).

Next, the operation determiner 580 determines whether the calculated absolute value is equal to or greater than the start voltage difference (S1405). If it is equal to or greater than the start voltage difference, the process ends; and if it is smaller than the voltage difference, the process returns to S1403.

Figure 14:
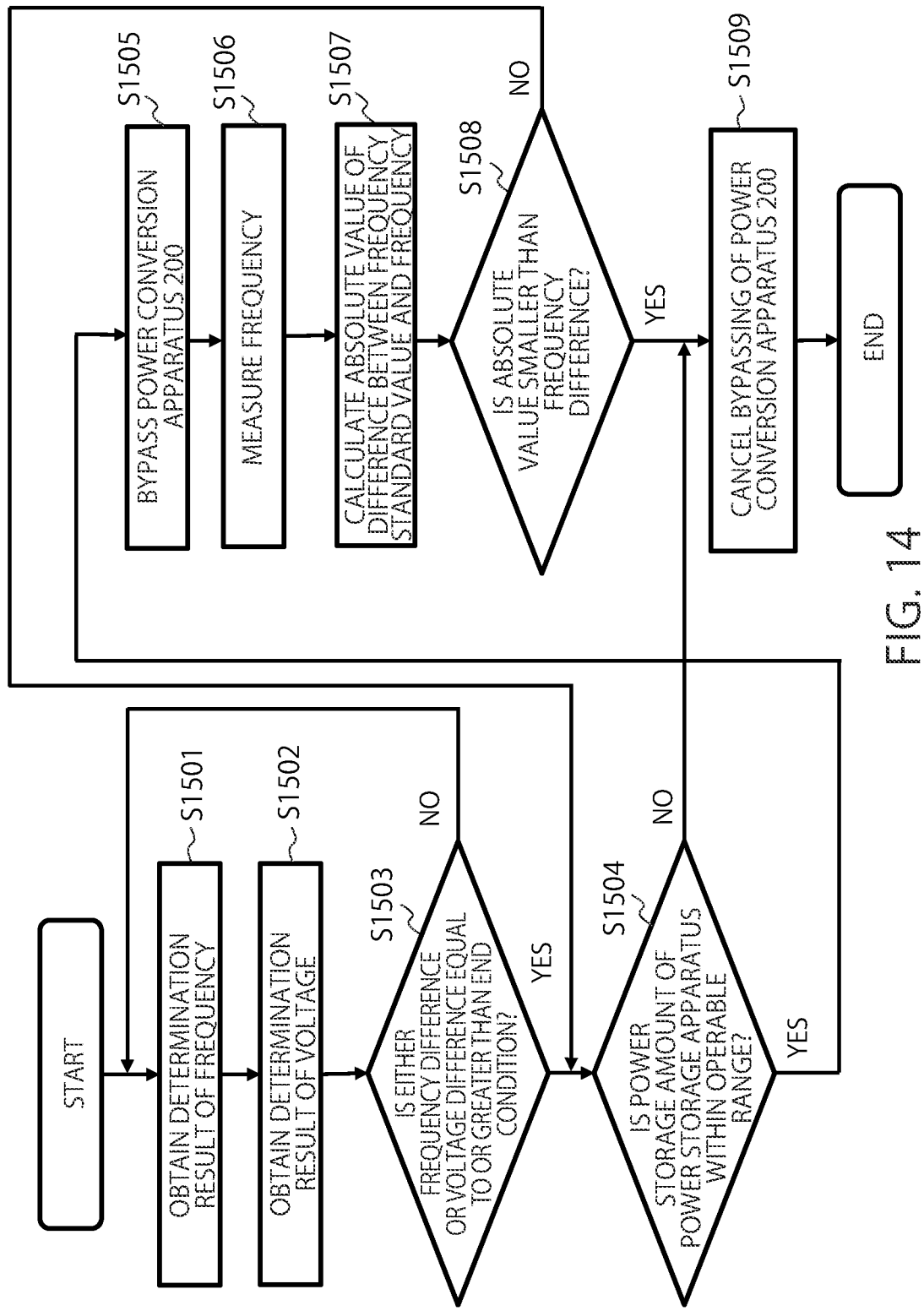
FIG. 14 is a flowchart schematically illustrating an operation in the case of causing the bypass circuit to perform a bypass operation.

FIG. 14 is a flowchart schematically illustrating an operation in the case of causing the bypass circuit 300 to perform a bypass operation.

First, the operation determiner 580 obtains a determination result of a frequency difference (S1501). Similarly, the operation determiner 580 obtains a determination result of a voltage difference (S1502).

Next, the operation determiner 580 determines whether the determination result of the frequency difference is equal to or greater than the end frequency difference or whether the determination result of the voltage difference is equal to or greater than the end voltage difference (S1503). If either the frequency difference or the voltage difference is positive, the process advances to S1504 and if they are smaller than their respective predetermined differences, the process advances to S1509.

Next, the charge/discharge power calculator 530 determines whether the stored power in the power storage apparatus 210 is within the operable range of the bypass circuit 300 according to power information obtained from the power storage amount receiver 520 (S1504). For example, in a case where the power storage apparatus 210 discharges power, it determines whether the power storage amount is equal to or more than a threshold. For example, in a case where the power storage apparatus 210 is charged, it determines whether the power storage amount is less than a threshold.

If the power storage amount is within the operable range, the process advances to S1505 and if not, the process advances to S1509.

The operation determiner 580 controls the bypass control commander 590 to short the bypass circuit 300 (S1505). This makes a direct connection between the power storage apparatus 210 and the direct current link 2000.

The measurer 570 measures the frequency of the power distribution grid 410 (S1506). The operation determiner 580 calculates an absolute value of a difference between the measured frequency of the power distribution grid 410 and the standard value (S1507).

The operation determiner 580 determines whether the calculated absolute value is equal to or greater than the end frequency difference (S1508). If it is smaller than the end frequency difference, the process advances to S1509 and if it is greater than the end frequency difference, the process returns to S1504.

Next, the operation determiner 580 controls the bypass control commander 590 to open the bypass circuit 300 (S1509). This releases a direct connection between the power storage apparatus 210 and the direct current link 2000.

Note that although calculation in S1506 to S1508 is performed with reference to the frequency in this flowchart, it may be performed with reference to the voltage.

As described above, according to the embodiment, the bypass circuit 300 is opened or shorted according to the power demand of the power distribution grid 410, thereby controlling a direct connection between the power storage apparatus 210 and the direct current link 2000.

Thus, the bypass circuit 300 allows an improvement in the amount of power conversion in the power conversion apparatus 400 not through the power conversion apparatus 200 connected with the power storage apparatus 210. That is, the bypass circuit 300 allows a reduction in the time taken before variations due to load variations in the power distribution grid 410 are stabilized.

The present invention is not limited just to the above embodiment, and may be embodied by modifying the components without departing from the gist thereof in a practical phase. Further, various inventions may be formed by any appropriate combination of the multiple components disclosed in the above embodiment. For example, some components may be eliminated from all the components shown in the embodiment. Furthermore, components in different embodiments may be appropriately combined.

The invention claimed is:

1. A bypass circuit, comprising:
a switch configured to short-circuit between a first power conversion apparatus and a power storage apparatus, the switch being connected in parallel to a second power conversion apparatus, a third power conversion apparatus being connected in an input-side of the first power conversion apparatus, the third power conversion apparatus converting power which is generated from natural energy,
the first power conversion apparatus converting power converted by the third power conversion apparatus and outputting the converted power to a power distribution grid,
the second power conversion apparatus converting surplus power that has not been converted by the first power conversion apparatus and charging the power storage apparatus with the converted power, or converting power discharged from the power storage apparatus and supplying the converted power to the first power conversion apparatus; and
a controller configured to control opening and closing of the switch,
wherein the controller controls the switch based on a voltage that is output by the first power conversion apparatus,
the controller controls the switch based on a difference between the voltage that is output by the first power conversion apparatus and a first voltage,
a contact point between the switch and the first power conversion apparatus is connected to the power distribution grid via the first power conversion apparatus, and
the controller controls the switch based on a frequency of power that is output by the first power conversion apparatus.

2. The bypass circuit according to claim 1, wherein when the difference between the voltage and the first voltage is equal to or greater than a threshold, the controller closes the switch.

3. The bypass circuit according to claim 1, wherein
the first voltage is a standard voltage based on a power command value.

4. The bypass circuit according to claim 1, wherein
the controller controls the switch based on a difference between the frequency of power that is output by the first power conversion apparatus and a first frequency.

5. The bypass circuit according to claim 4, wherein
when the difference between the frequency and the first frequency is equal to or greater than a threshold, the controller closes the switch.

6. The bypass circuit according to claim 4, wherein
the first frequency is a standard frequency based on a power command value.

7. The bypass circuit according to claim 1, wherein
the first power conversion apparatus converts power generated from natural energy under maximum power point tracking control.

8. A power system control method comprising:
controlling a switch, the switch shorting-circuit between a first power conversion apparatus and a power storage apparatus, the switch being connected in parallel to a second power conversion apparatus,
  the first power conversion apparatus converting power which is generated from natural energy and converted by a third power conversion apparatus connected in an input-side of the first power conversion apparatus and outputting the converted power to a power distribution grid, and a contact point between the switch and the first power conversion apparatus being connected to the power distribution grid via the first power conversion apparatus,
  the second power conversion apparatus converting surplus power that has not been converted by the first power conversion apparatus and charging the power storage apparatus with the converted power, or converting power discharged from the power storage apparatus and supplying the converted power to the first power conversion apparatus;
controlling opening and closing of the switch;
controlling the switch based on a voltage that is output by the first power conversion apparatus;
controlling the switch based on a difference between the voltage that is output by the first power conversion apparatus and a first voltage; and
controlling the switch based on a frequency of power that is output by the first power conversion apparatus.

9. A non-transitory computer readable medium having a computer program stored therein which when executed by a computer, causes the computer to perform processes comprising:
controlling a switch, the switch shorting-circuit between a first power conversion apparatus and a power storage apparatus, the switch being connected in parallel to a second power conversion apparatus,
  the first power conversion apparatus converting power which is generated from natural energy and converted by a third power conversion apparatus connected in an input-side of the first power conversion apparatus and outputting the converted power to a power distribution grid, and a contact point between the switch and the first power conversion apparatus being connected to the power distribution grid via the first power conversion apparatus,
  the second power conversion apparatus converting surplus power that has not been converted by the first power conversion apparatus and charging the power storage apparatus with the converted power, or converting power discharged from the power storage apparatus and supplying the converted power to the first power conversion apparatus;
controlling opening and closing of the switch;
controlling the switch based on a voltage that is output by the first power conversion apparatus;
controlling the switch based on a difference between the voltage that is output by the first power conversion apparatus and a first voltage; and
controlling the switch based on a frequency of power that is output by the first power conversion apparatus.

10. A bypass circuit, comprising:
a switch configured to short-circuit between a first power conversion apparatus and a power storage apparatus, the switch being connected in parallel to a second power conversion apparatus, a third power conversion apparatus being connected in an input-side of the first power conversion apparatus,
  the third power conversion apparatus converting power which is generated from natural energy,
  the first power conversion apparatus converting power converted by the third power conversion apparatus and outputting the converted power to a power distribution grid,
  the second power conversion apparatus converting surplus power that has not been converted by the first power conversion apparatus and charging the power storage apparatus with the converted power, or converting power discharged from the power storage apparatus and supplying the converted power to the first power conversion apparatus, and
a controller configured to control opening and closing of the switch
wherein the controller controls the switch based on a voltage that is output by the first power conversion apparatus,
the controller controls the switch based on a difference between the voltage that is output by the first power conversion apparatus and a first voltage,
a contact point between the switch and the first power conversion apparatus is connected to the power distribution grid via the first power conversion apparatus,
when the difference between the voltage and the first voltage is equal to or greater than a threshold, the controller closes the switch, and
if the switch is closed when an input-side voltage of the first power conversion apparatus is lower than a voltage of the power storage apparatus, the power storage apparatus is discharged.

11. A bypass circuit, comprising:
a switch configured to short-circuit between a first power conversion apparatus and a power storage apparatus, the switch being connected in parallel to a second power conversion apparatus, a third power conversion apparatus being connected in an input-side of the first power conversion apparatus,
  the third power conversion apparatus converting power which is generated from natural energy,
  the first power conversion apparatus converting power converted by the third power conversion apparatus and outputting the converted power to a power distribution grid,
  the second power conversion apparatus converting surplus power that has not been converted by the first power conversion apparatus and charging the power storage apparatus with the converted power, or converting power discharged from the power storage apparatus and supplying the converted power to the first power conversion apparatus, and a controller configured to control opening and closing of the switch wherein the controller controls the switch based on a voltage that is output by the first power conversion apparatus, the controller controls the switch based on a difference between the voltage that is output by the first power conversion apparatus and a first voltage, a contact point between the switch and the first power conversion apparatus is connected to the power distribution grid via the first power conversion apparatus, when the difference between the voltage and the first voltage is equal to or greater than a threshold, the controller closes the switch, and the power storage apparatus is charged when the switch is closed if a voltage of the power distribution grid is larger than a standard value based on a power command value.

12. A bypass circuit, comprising:

a switch configured to short-circuit between a first power conversion apparatus and a power storage apparatus, the switch being connected in parallel to a second power conversion apparatus, the first power conversion apparatus converting power generated from natural energy and outputting the converted power to a power distribution grid, the second power conversion apparatus converting surplus power that has not been converted by the first power conversion apparatus and charging the power storage apparatus with the converted power, or converting power discharged from the power storage apparatus and supplying the converted power to the first power conversion apparatus, and a controller configured to control opening and closing of the switch, wherein the controller controls the switch based on a frequency of power that is output by the first power conversion apparatus.

13. The bypass circuit according to claim 12, wherein the controller controls the switch based on a difference between the frequency of power that is output by the first power conversion apparatus and a first frequency.

14. The bypass circuit according to claim 13, wherein when the difference between the frequency and the first frequency is equal to or greater than a threshold, the controller closes the switch.

15. The bypass circuit according to claim 13, wherein the first frequency is a standard frequency based on a power command value.

* * * * *